(12) United States Patent
Yan et al.

(10) Patent No.: US 11,743,893 B2
(45) Date of Patent: Aug. 29, 2023

(54) CONTROL MESSAGE TRANSMISSION

(71) Applicant: LENOVO (BEIJING) LIMITED, Beijing (CN)

(72) Inventors: Zhi Yan, Beijing (CN); Xiaodong Yu, Beijing (CN); Haipeng Lei, Beijing (CN); Chenxi Zhu, Fairfax, VA (US); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 159 days.

(21) Appl. No.: 16/964,022

(22) PCT Filed: Jan. 26, 2018

(86) PCT No.: PCT/CN2018/074308
§ 371 (c)(1),
(2) Date: Jul. 22, 2020

(87) PCT Pub. No.: WO2019/144376
PCT Pub. Date: Aug. 1, 2019

(65) Prior Publication Data
US 2021/0037514 A1 Feb. 4, 2021

(51) Int. Cl.
*H04W 72/20* (2023.01)
*H04L 1/1867* (2023.01)
*H04L 5/00* (2006.01)

(52) U.S. Cl.
CPC ........... *H04W 72/20* (2023.01); *H04L 1/1896* (2013.01); *H04L 5/0046* (2013.01)

(58) Field of Classification Search
CPC ..... H04L 1/1896; H04L 5/003; H04L 5/0046; H04L 5/0048; H04L 5/0053; H04L 5/0055; H04L 5/0091; H04L 5/0094; H04W 72/0406; H04W 72/042
See application file for complete search history.

(56) References Cited

U.S. PATENT DOCUMENTS

| | | | |
|---|---|---|---|
| 2020/0014498 A1* | 1/2020 | Bergman | H04L 1/0079 |
| 2020/0092044 A1* | 3/2020 | Park | H04W 28/04 |
| 2020/0092858 A1* | 3/2020 | Ye | H04L 1/08 |

(Continued)

FOREIGN PATENT DOCUMENTS

| | | |
|---|---|---|
| CN | 106559188 A | 4/2017 |
| WO | 2016147994 A1 | 9/2016 |

OTHER PUBLICATIONS

Lenovo, Motorola Mobility, Discussion on UL HARQ-ACK feedback, 3GPP TSG RAN WG1 Meeting #90bis, R1-1717439, Oct. 9-13, 2017, pp. 1-6, Prague, P.R. Czech.

(Continued)

*Primary Examiner* — Pao Sinkantarakorn
(74) *Attorney, Agent, or Firm* — Kunzler Bean & Adamson

(57) ABSTRACT

Methods and apparatuses for transmitting a control message are disclosed. A method comprising: transmitting a control message including an indicator for indicating at least one of termination of a control channel monitoring, termination of a data transmission and a feedback corresponding to the data transmission, wherein the indicator is determined based on at least one of a system bandwidth, a maximum bandwidth of the data transmission and a bit length of the indicator.

10 Claims, 4 Drawing Sheets

(56) References Cited

U.S. PATENT DOCUMENTS

2020/0187237 A1* 6/2020 Su .......................... H04L 1/1854
2020/0287663 A1* 9/2020 Chen ..................... H04W 76/28

OTHER PUBLICATIONS

ZTE, Sanechips, Remaining issues on UL HARQ-ACK feedback for MTC, 3GPP TSG RAN WG1 Meeting #91, R1-1719712, Nov. 27-Dec. 1, 2017, pp. 1-5, Reno, USA.
PCT/CN2018/074308, "International Search Report and the Written Opinion of the International Search Authority" ISA/CN, State Intellectual Property Office of the P.R. China, May 30, 2018, pp. 1-6.
Ericsson, "Uplink HARQ-ACK feedback for MTC", R1-1719352, 3GPP TSG-RAN WG1 Meeting #91, Nov. 27-Dec. 1, 2017, pp. 1-6.

* cited by examiner

CONTROL MESSAGE TRANSMISSION

FIELD

The subject matter disclosed herein generally relates to wireless communications, and more particularly relates to transmitting and receiving a control message.

BACKGROUND

The following abbreviations are herewith defined, some of which are referred to within the following description: Third Generation Partnership Project (3GPP), Downlink (DL), Downlink Control Information (DCI), Evolved Node B (eNB), European Telecommunications Standards Institute (ETSI), Enhanced Interference Management and Traffic Adaptation (eIMTA), Frequency Division Duplex (FDD), Frequency Division Multiple Access (FDMA), Hybrid Automatic Repeat Request Acknowledgement (HARQ-ACK), Internet-of-Things (IoT), Long Term Evolution (LTE), Next Generation Node B (gNB), New Radio (NR), Negative Acknowledgement (NACK), Orthogonal Frequency Division Multiplexing (OFDM), Physical Resource Block (PRB), Physical Downlink Shared Channel (PDSCH), Physical Uplink Control Channel (PUCCH), Physical Uplink Shared Channel (PUSCH), Positive Acknowledgement (ACK), Radio Resource Control (RRC), Resource Indication Value (RIV), Single Carrier Frequency Division Multiple Access (SC-FDMA), System Information (SI), Signal to Interference plus Noise Ratio (SINR), Transport Block (TB), Time-Division Duplex (TDD), Time Division Multiplex (TDM), User Entity/Equipment (Mobile Terminal) (UE), Uplink (UL), Uplink Control Information (UCI), Universal Mobile Telecommunications System (UMTS), Ultra Reliable & Low Latency Communication (URLLC) and Worldwide Interoperability for Microwave Access (WiMAX).

Downlink Control Information (DCI) is control information transmitted from a base unit to a remote unit. The DCI has many different formats. DCI format 6-0A is used for the scheduling of Physical Uplink Shared Channel (PUSCH) in one UL cell. Among various information contained in the DCI format 6-0A, the resource block assignment field is used for PUSCH resource allocation.

The resource block assignment field has $$\left\lceil \log_2\left\lfloor \frac{N_{RB}^{UL}}{6} \right\rfloor \right\rceil + 5 \text{ bits,}$$

in which the $$\left\lceil \log_2\left\lfloor \frac{N_{RB}^{UL}}{6} \right\rfloor \right\rceil$$

is used to indicate the narrowband index, whose length is determined by the uplink system bandwidth.

$$\left\lceil \log_2\left\lfloor \frac{N_{RB}^{UL}}{6} \right\rfloor \right\rceil$$

is {0, 1, 2, 3, 4, 4} bit(s) for a system bandwidth of {6, 15, 25, 50, 75, 100} PRBs. The remaining 5 bits are used to provide the resource allocation within the indicated narrowband index in R.13 or the number of consecutive resource block groups starting from the indicated narrowband index in R.14. There are some unused states in the resource block assignment field, which may be used for other purposes.

BRIEF SUMMARY

Methods and apparatuses for transmitting and receiving a control message are disclosed.

In one embodiment, a method comprising: transmitting a control message including an indicator for indicating at least one of termination of a control channel monitoring, termination of a data transmission and a feedback corresponding to the data transmission, wherein the indicator is determined based on at least one of a system bandwidth, a maximum bandwidth of the data transmission and a bit length of the indicator.

In one embodiment, the maximum bandwidth of the data transmission is configured by a higher layer signaling.

In another embodiment, the feedback corresponding to the data transmission comprises ACK in response to the data being correctly decoded or NACK in response to the data not being correctly decoded.

In some embodiment, the indicator is one or more of unused states of the resource block assignment field of the control message.

In some embodiment, the length of the indicator is predetermined, wherein the indicator may be a binary value with all "1"; or a binary value with a pattern of "x0" in which "x" is all "1"; or a binary value with the pattern of "x00" in which "x" is all "1".

In one embodiment, an apparatus comprising: a transmitter that transmits a control message including an indicator for indicating at least one of termination of a control channel monitoring, termination of a data transmission and a feedback corresponding to the data transmission, wherein the indicator is determined based on at least one of a system bandwidth, a maximum bandwidth of the data transmission and a bit length of the indicator.

In another embodiment, a method comprising: receiving a control message including an indicator for indicating at least one of termination of a control channel monitoring, termination of a data transmission and a feedback corresponding to the data transmission, wherein the indicator is determined based on at least one of a system bandwidth, a maximum bandwidth of the data transmission and a bit length of the indicator.

In yet another embodiment, an apparatus comprising: a receiver that receives a control message including an indicator for indicating at least one of termination of a control channel monitoring, termination of a data transmission and a feedback corresponding to the data transmission, wherein the indicator is determined based on at least one of a system bandwidth, a maximum bandwidth of the data transmission and a bit length of the indicator.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
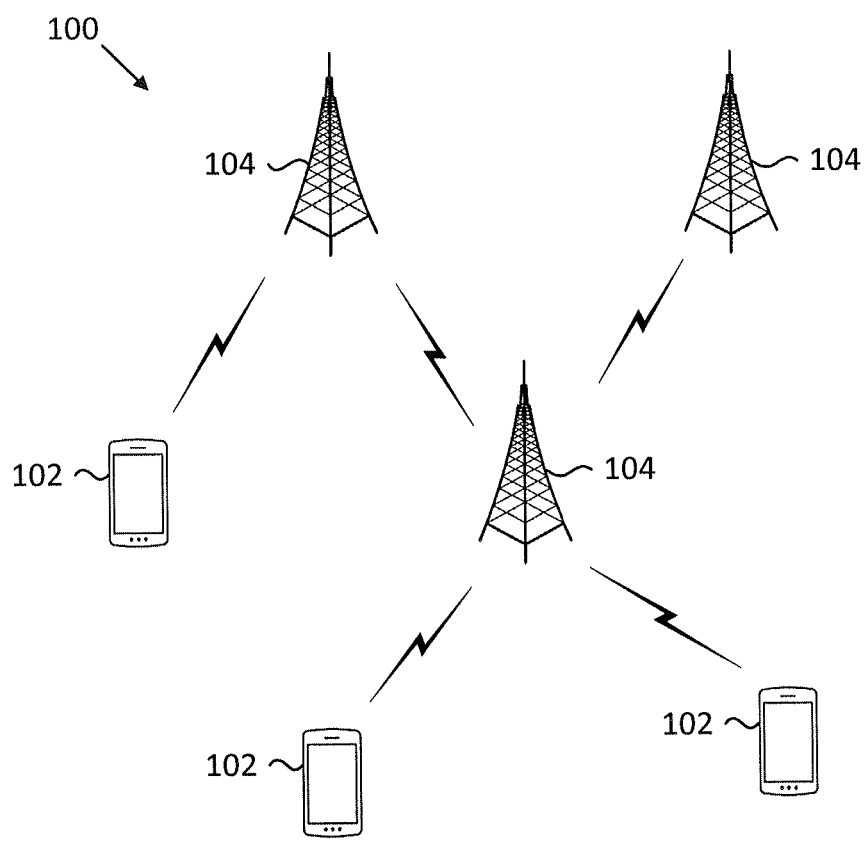
FIG. 1 is a schematic block diagram illustrating one embodiment of a wireless communication system for transmitting and receiving a control message.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory ("RAM"), read-only memory ("ROM"), erasable programmable read-only memory ("EPROM" or "Flash Memory"), portable compact disc read-only memory ("CD-ROM"), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The description of elements in each figure may refer to elements of proceeding figures. Like numbers refer to like elements in all figures, including alternate embodiments of like elements.

FIG. 1 depicts an embodiment of a wireless communication system 100 for transmitting and receiving a control message. In one embodiment, the wireless communication system 100 includes remote units 102 and base units 104. Even though a specific number of remote units 102 and base units 104 are depicted in FIG. 1, one skilled in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. The remote units 102 may be referred to as subscriber units, mobiles, mobile stations, users, terminals, mobile terminals, fixed terminals, subscriber stations, UE, user terminals, a device, or by other terminology used in the art. The remote units 102 may be a terminal of an IoT (Internet-of-Things). The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In various embodiments, a base unit 104 may transmit a control message including an indicator for indicating at least one of termination of a control channel monitoring, termination of a data transmission and a feedback corresponding to the data transmission, wherein the indicator is determined based on at least one of a system bandwidth, a maximum bandwidth of the data transmission and a bit length of the indicator.

In certain embodiments, a remote unit 102 may receive the control message including an indicator for indicating at least one of termination of a control channel monitoring, termination of a data transmission and a feedback corresponding to the data transmission, wherein the indicator is determined based on at least one of a system bandwidth, a maximum bandwidth of the data transmission and a bit length of the indicator.

Figure 2:
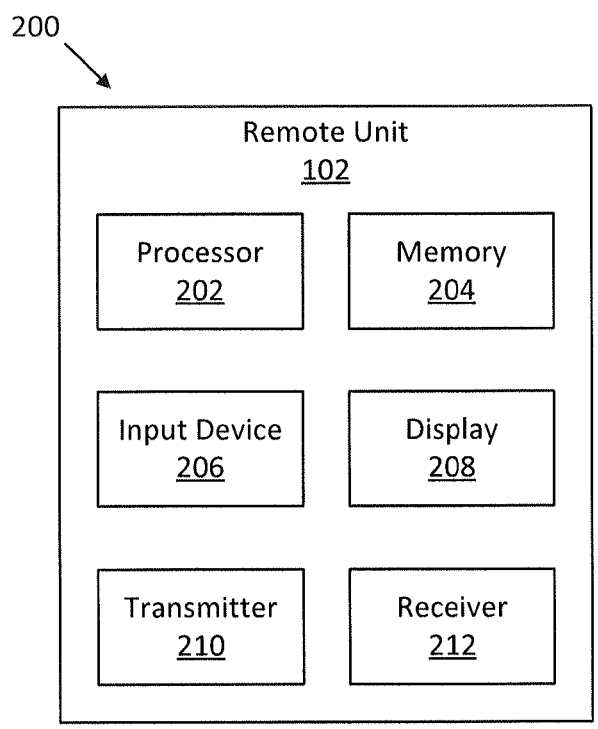
FIG. 2 is a schematic block diagram illustrating one embodiment of an apparatus that may be used for receiving a control message.

FIG. 2 depicts one embodiment of an apparatus 200 that may be used for receiving the control message. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the receiver 212 may be used to receive the control message. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
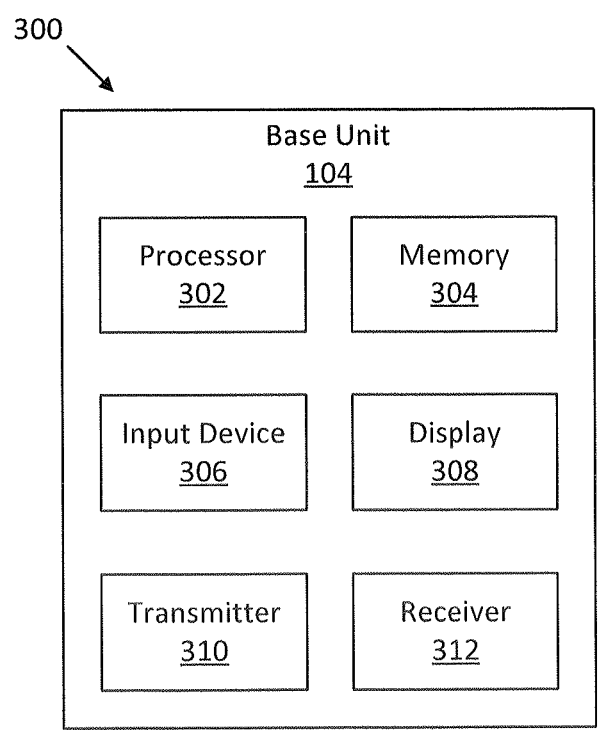
FIG. 3 is a schematic block diagram illustrating one embodiment of an apparatus that may be used for transmitting a control message.

FIG. 3 depicts one embodiment of an apparatus 300 that may be used for transmitting the control message. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 is used to transmit the control message. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Table 1 shows the PUSCH resource allocation indices in CE mode A.

| Configured maximum PUSCH channel bandwidth | System bandwidth | Length of the resource block assignment field | Number of unused states in resource block assignment field in DCI format 6-0A |
|---|---|---|---|
| 1.4 MHz | 1.4 MHz | 5 | 11 |
|  | 3 MHz | 6 | 2 * 11 = 22 |
|  | 5 MHz | 7 | 4 * 11 = 44 |
|  | 10 MHz | 8 | 8 * 11 = 88 |
|  | 15 MHz | 9 | 16 * 11 = 176 |
|  | 20 MHz | 9 | 16 * 11 = 176 |
| 5 MHz | 1.4 MHz | 5 | 11 − 0 = 11 |
|  | 3 MHz | 6 | 22 − 3 = 19 |
|  | 5 MHz | 7 | 44 − 19 = 25 |
|  | 10 MHz | 8 | 88 − 59 = 29 |
|  | 15 MHz | 9 | 176 − 99 = 77 |
|  | 20 MHz | 9 | 176 − 139 = 37 |

As can be from the Table 1, for all possible configurations, at least 11 states (or resource indication values, RIVs) are unused for the resource assignment field for DCI format 6-0A in CE mode A. These unused states may be used for indicating at least one of termination of a control channel monitoring, termination of a data transmission and a feedback corresponding to the data transmission. As can be seen from the Table 1, a maximum PUSCH channel bandwidth, a system bandwidth and a bit length of the resource block assignment field are the factors that are necessary to be considered when determining which unused states are to be used for indicating at least one of termination of a control channel monitoring, termination of a data transmission and a feedback corresponding to the data transmission.

The maximum PUSCH channel bandwidth may be configured by a higher layer signaling. In the condition that the parameter ce-pusch-maxBandwidth-config is set to OFF, the the maximal PUSCH channel bandwidth is 6 PRBs (Physical Resource Blocks) (i.e. 1.4 MHz). In the condition that the parameter ce-pusch-maxBandwidth-config is set to ON, the maximal PUSCH channel bandwidth is 24 PRBs (i.e. 5 MHz).

The system bandwidth may range from 6 PRBs to 110 PRBs. The conventional deployment of system is one of 1.4 MHz (6 PRBs), 3 MHz (15 PRBs), 5 MHz (25 PRBs), 10 MHz (50 PRBs), 15 MHz (75 PRBs), and 20 MHz (100 PRBs).

For different system bandwidths, the lengths of the resource block assignment field in DCI format 6-0A are different but are determined by system bandwidths, which may be 5, 6, 7, 8 or 9 bits for different system bandwidths.

In view of the above, the number of unused states in the resource block assignment field in DCI format 6-0A may vary depending on at least one of the maximum PUSCH channel bandwidth, the system bandwidth and the bit length of the resource block assignment field.

The resource block assignment field is used for assigning resources for the remote unit to transmit a new data or retransmit the data that is not correctly received at the base unit.

The unused states of the resource block assignment field may be used for other purposes, for example, for indicating that the data is correctly received at the base unit. There are various ways to inform the remote unit of data being correctly received at the base unit. For example, the base unit may transmit a feedback corresponding to the data transmission to the remote unit. An ACK (acknowledgement) may correspond to the data being correctly decoded. An NACK (negative acknowledgement) may correspond to the data not being correctly decoded. The ACK feedback allows the remote unit to know that the data has been correctly decoded at the base unit, and therefore, the retransmission is unnecessary. The base unit may terminate the MPDCCH monitoring and/or the ongoing PUSCH transmission of the remote unit. When the monitoring of the MPDCCH is terminated, the remote unit is able to go to sleep when it is configured with DRX operation in RRC connected mode, or when the remote unit is released from RRC connected mode to RRC idle mode.

Preferably, in the case of early termination of MPDCCH monitoring and early termination of any ongoing PUSCH transmission (referred to as "case 01"), the remote unit can directly go to sleep. In another case of early termination of MPDCCH monitoring without early termination of any ongoing PUSCH transmission (referred to as "case 02"), the remote unit can terminate all of PUSCH transmissions but still monitor the MPDCCH.

Any of the unused states of the resource block assignment field may be chosen to indicate at least one of the feedback corresponding the data transmission, the termination of the control channel (MPDCCH) monitoring, and the termination of a data transmission (on PUSCH).

As shown in Table 1, the unused states of the resource block assignment field are different depending on at least one of the maximum PUSCH channel bandwidth, the system bandwidth and the bit length of the resource block assignment field.

A study of the unused states of the resource block assignment field in different situations reveals that a unified state for indicating the case 01 (or for indicating the case 02) cannot be found.

Figure 4:
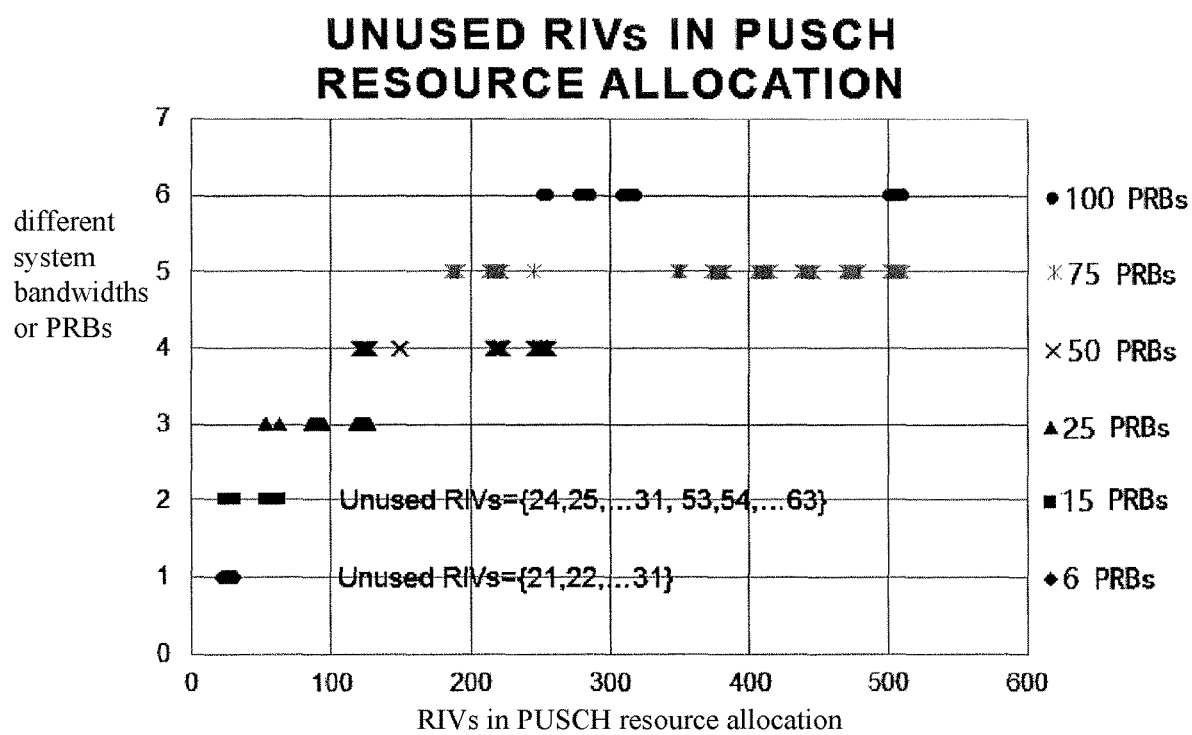
FIG. 4 is a schematic diagram showing unused RIVs in PUSCH resource allocation for the maximum configured PUSCH channel bandwidth of 5 MHz.

FIG. 4 shows unused RIVs (i.e. unused states) in PUSCH resource allocation for the maximum PUSCH channel bandwidth of 5 MHz (i.e. 24 PRBs).

The unused RIVs for the system bandwidths of 6 PRBs (i.e. 1.4 MHz) and 15 PRBs (i.e. 3 MHz) are listed. It can be seen that RIVs={24, 25, . . . , 31} are available for the bandwidths of 6 or 15 PRBs. However, a further study of the RIVs for other bandwidths (not shown in FIG. 4) reveals that RIVs={24, 25, . . . , 31} are unavailable for other system bandwidths of 25/50/75/100 PRBs.

Therefore, the unused states chosen for the case 01 and the case 02 depend on at least one of the following factors: the maximum PUSCH channel bandwidth, the system bandwidth and the bit length of the resource block assignment field.

Embodiments of determining which of the unused states are for the indication are described below.

Table 2 shows the first embodiment.

| Case | Unused state to be used for indication |
|---|---|
| Case 01 | 31 (Binary: x11111) |
| Case 02 | 28 (Binary: x11100) | x is the zeros (if necessary) padding to the bit length of resource block assignment field.

In the condition that the parameter ce-pusch-maxBandwidth-config is set to OFF, the maximal PUSCH channel bandwidth is set to 6 PRBs (i.e. 1.4 MHz). In this condition, a unified design for different system bandwidths can be achieved as shown in the Table 2. That is, in the condition of the maximal PUSCH channel bandwidth being set to 6 PRBs, for all of system bandwidths of 6/15/25/50/75/100 PRBs (i.e. 1.4/3/5/10/15/20 MHz), 31 and 28 are among the unused states. Therefore, 31 and 28 may be chosen as the indicators to indicate case 01 (Early termination of MPDCCH monitoring and early termination of any ongoing PUSCH transmission) and case 02 (Early termination of any ongoing PUSCH transmission without early termination of MPDCCH monitoring), respectively.

Needless to say, 31 and 28 are only for the purpose of illustration. Other unused states can alternatively be used as the indicators to indicate the case 01 and/or the case 02.

Table 3 shows the detailed implementation of the first embodiment.

| Configured maximum PUSCH channel bandwidth | System bandwidth | Length of the resource block assignment field | Number of unused states in resource block assignment field in DCI format 6-0A | Case 01 | Case 02 |
|---|---|---|---|---|---|
| 1.4 MHz | 1.4 MHz | 5 | 11 | 31(11111) | 28(11100) |
| | 3 MHz | 6 | 2 * 11 = 22 | 31(011111) | 28(011100) |
| | 5 MHz | 7 | 4 * 11 = 44 | 31(0011111) | 28(0011100) |
| | 10 MHz | 8 | 8 * 11 = 88 | 31(00011111) | 28(00011100) |
| | 15 MHz | 9 | 16 * 11 = 176 | 31(000011111) | 28(000011100) |
| | 20 MHz | 9 | 16 * 11 = 176 | 31(000011111) | 28(000011100) |

Table 4 shows the second embodiment.

| System bandwidth (PRBs) | Case 01 | Case 02 |
|---|---|---|
| 6/15 | 31(x11111) | 28(x11100) |
| 25/50 | 127(x1111111) | 124(x1111100) |
| 75/100 | 511(x111111111) | 504(x111111000) | x is the zeros (if necessary) padding to the bit length of resource block assignment field.

In the condition that the parameter ce-pusch-maxBandwidth-config is set to ON, the maximal PUSCH channel bandwidth is set to be 24 PRBs (5 MHz).

As there is no unified states to indicate the case 01 and case 02 for different system bandwidths, different states may be chosen for different bandwidths. In the second embodiment shown in the Table 4, 31 and 28 may be chosen as the indicators for the bandwidths of 6/15 PRBs; 127 and 124 may be chosen as the indicators for the bandwidths of 25/50 PRBs; and 511 and 504 may be chosen as the indicators for the bandwidths of 75/100 PRBs.

Needless to say, 31, 28, 127, 124, 511 and 504 are only for the purpose of illustration. Other unused states can alternatively be used as the indicators to indicate the case 01 and/or the case 02.

In the Table 4, the preceding x is the zero padding to the bit length of the resource block assignment field, if necessary. The number of x in the Table 4 may be 1 or 0.

Table 5 shows the detailed implementation of the second embodiment.

| Configured maximum PUSCH channel bandwidth | System bandwidth | Length of the resource block assignment field | Number of unused states in resource block assignment field in DCI format 6-0A | Case 01 | Case 02 |
|---|---|---|---|---|---|
| 5 MHz | 1.4 MHz | 5 | 11 − 0 = 11 | 31(11111) | 28(11100) |
| | 3 MHz | 6 | 22 − 3 = 19 | 31(011111) | 28(011100) |
| | 5 MHz | 7 | 44 − 19 = 25 | 127(1111111) | 124(1111100) |
| | 10 MHz | 8 | 88 − 59 = 29 | 127(01111111) | 124(01111100) |
| | 15 MHz | 9 | 176 − 99 = 77 | 511(111111111) | 504(111111100) |
| | 20 MHz | 9 | 176 − 139 = 37 | 511(111111111) | 504(111111100) |

As can be seen from the first embodiment and the second embodiment, the indicators are determined by referring at least to the maximum PUSCH channel bandwidth. In the first embodiment, in the condition that the maximum PUSCH channel bandwidth is set to 6 PRBs, the indicators can be uniformly determined for different system bandwidths. On the other hand, in the second embodiment, the indicators cannot be uniformly determined for different system bandwidths. In other words, the indicators in the second embodiment are determined by further referring to the system bandwidth.

Table 6 shows the third embodiment.

| Case 01 | Case 02 |
|---|---|
| Binary: (x1) | Binary: (x0) | x is the "1"s padding to the bit length of the resource block assignment field.

The third embodiment determines the unused states based on the bit length of the resource block assignment field, without considering the maximum PUSCH channel bandwidth and/or the system bandwidth.

In the Table 6, x is all "1" bit, the length of x is the length of the predetermined resource block assignment field minus 1. For example, in the condition that the bit length of resource block assignment field is 7, x is "111111". Therefore, the case 01 is "1111111" and the case 02 is "1111110".

In the condition that the bit length of resource block assignment field is 9, x is "11111111".

Table 7 shows the detailed implementation of the third embodiment.

| Bit Length of the resource block assignment field | Number of unused states in resource block assignment field in DCI format 6-0A | Case 01 | Case 02 |
|---|---|---|---|
| 5 | 11 | 11111 | 11110 |
| 6 | 2 * 11 = 22 | 111111 | 111110 |
| 7 | 4 * 11 = 44 | 1111111 | 1111110 |
| 8 | 8 * 11 = 88 | 11111111 | 11111110 |
| 9 | 16 * 11 = 176 | 111111111 | 111111110 |
| 9 | 16 * 11 = 176 | 111111111 | 111111110 |
| 5 | 11 − 0 = 11 | 11111 | 11110 |
| 6 | 22 − 3 = 19 | 111111 | 111110 |
| 7 | 44 − 19 = 25 | 1111111 | 1111110 |
| 8 | 88 − 59 = 29 | 11111111 | 11111110 |
| 9 | 176 − 99 = 77 | 111111111 | 111111110 |
| 9 | 176 − 139 = 37 | 111111111 | 111111110 |

Table 8 shows the fourth embodiment.

| Case 01 | Case 02 |
|---|---|
| Binary: (x11) | Binary: (x00) | x is the "1"s padding to the bit length of the resource block assignment field.

Similar to the third embodiment, the fourth embodiment determines the unused states based on the bit length of the resource block assignment field.

In the Table 8, x is all "1" bit, the length of x is the length of the predetermined resource block assignment field minus 2. For example, in the condition that the bit length of resource block assignment field is 7, x is "11111". Therefore, the case 01 is "1111111" and the case 02 is "1111100".

In the condition that the bit length of resource block assignment field is 9, x is "1111111".

Table 9 shows the detailed implementation of the fourth embodiment.

| Bit Length of the resource block assignment field | Number of unused states in resource block assignment field in DCI format 6-0A | Case 01 | Case 02 |
|---|---|---|---|
| 5 | 11 | 11111 | 11100 |
| 6 | 2 * 11 = 22 | 111111 | 111100 |
| 7 | 4 * 11 = 44 | 1111111 | 1111100 |
| 8 | 8 * 11 = 88 | 11111111 | 11111100 |
| 9 | 16 * 11 = 176 | 111111111 | 111111100 |
| 9 | 16 * 11 = 176 | 111111111 | 111111100 |
| 5 | 11 − 0 = 11 | 11111 | 11100 |
| 6 | 22 − 3 = 19 | 111111 | 111100 |
| 7 | 44 − 19 = 25 | 1111111 | 1111100 |
| 8 | 88 − 59 = 29 | 11111111 | 11111100 |
| 9 | 176 − 99 = 77 | 111111111 | 111111100 |
| 9 | 176 − 139 = 37 | 111111111 | 111111100 |

Figure 5:
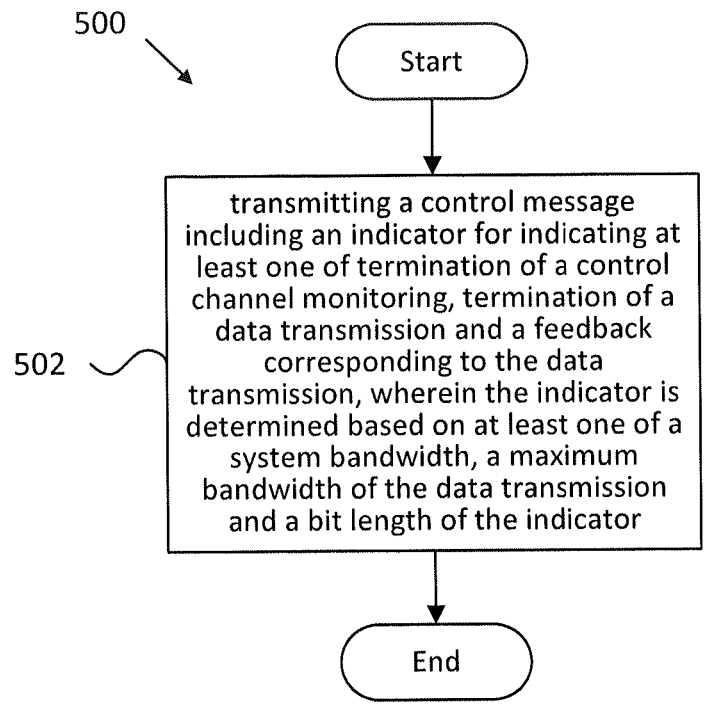
FIG. 5 is a schematic flow chart diagram illustrating an embodiment of a method for transmitting a control message.

FIG. 5 is a schematic flow chart diagram illustrating an embodiment of a method 500 for transmitting a control message. In some embodiments, the method 500 is performed by an apparatus, such as the base unit 104. In certain embodiments, the method 500 may be performed by a processor executing program code, for example, a microcontroller, a microprocessor, a CPU, a GPU, an auxiliary processing unit, a FPGA, or the like.

The method 500 may include 502 transmitting a control message including an indicator for indicating at least one of termination of a control channel monitoring, termination of a data transmission and a feedback corresponding to the data transmission, wherein the indicator is determined based on at least one of a system bandwidth, a maximum bandwidth of the data transmission and a bit length of the indicator.

In various embodiments, the maximum bandwidth of the data transmission is configured by a higher layer signaling. In another embodiment, the feedback corresponding to the data transmission comprises ACK in response to the data being correctly decoded or NACK in response to the data not being correctly decoded. In some embodiment, the indicator is one or more of unused states of the resource block assignment field of the control message.

In some embodiment, the length of the indicator is predetermined. As can be seen from the Table 1, the bit length of the resource block assignment field is 5, 6, 7, 8, 9 and 9, respectively, for the system bandwidth of 1.4, 3, 5, 10, 15 and 20 MHz. The indicator may be a binary value with all "1"; or a binary value with a pattern of "x0" in which "x" is all "1"; or a binary value with the pattern of "x00" in which "x" is all "1".

Figure 6:
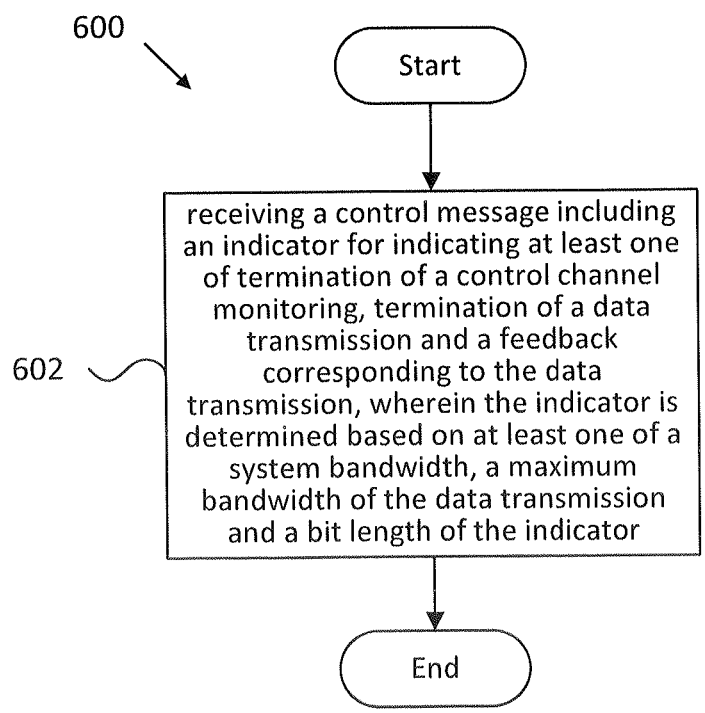
FIG. 6 is a schematic flow chart diagram illustrating an embodiment of a method for receiving a control message.

FIG. 6 is a schematic flow chart diagram illustrating a further embodiment of a method 600 for receiving the control message. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include 602 receiving the control message including an indicator for indicating at least one of termination of a control channel monitoring, termination of a data transmission and a feedback corresponding to the data transmission, wherein the indicator is determined based on at least one of a system bandwidth, a maximum bandwidth of the data transmission and a bit length of the indicator.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a base unit, the method comprising:
   transmitting a control message including an indicator for indicating termination of a control channel monitoring and termination of a data transmission,
   wherein the indicator is assigned to one or more of unused states of the resource block assignment field of the control message based on a bit length of the indicator,
   wherein the indicator is a binary value with a pattern of "x0" or "x00" for all system frequency bandwidths, "x" is all "1",
   wherein length of x is determined by a bit length of the resource block assignment field or an associated system frequency bandwidth.

2. The method of claim 1, wherein the indicator is assigned to one or more of unused states of the resource block assignment field of the control message further based on a maximum bandwidth.

3. An apparatus comprising: a transmitter that transmits a control message to a user equipment including an indicator for indicating termination of a control channel monitoring and termination of a data transmission wherein the indicator is assigned to one or more of unused states of the resource block assignment field of the control message based a bit length of the indicator,
   wherein the indicator is a binary value with a pattern of "x0" or "x00" for all system frequency bandwidths, "x" is all "1",
   wherein length of x is determined by a bit length of the resource block assignment field or an associated system frequency bandwidth.

4. The apparatus of claim 3, wherein the indicator further indicates a feedback corresponding to the data transmission, the feedback corresponding to the data transmission comprises acknowledgement in response to the data transmission being correctly decoded or negative acknowledgement in response to the data transmission not being correctly decoded.

5. The apparatus of claim 3, wherein the indicator is assigned to one or more of unused states of the resource block assignment field of the control message further based on a maximum bandwidth.

6. A method comprising: receiving a control message including an indicator for indicating termination of a control channel monitoring and termination of a data transmission wherein the indicator is assigned to one or more of unused states of the resource block assignment field of the control message based on a bit length of the indicator,
   wherein the indicator is a binary value with a pattern of "x0" or "x00" for all system frequency bandwidths, "x" is all "1",
   wherein length of x is determined by a bit length of the resource block assignment field or an associated system frequency bandwidth.

7. The method of claim 6, wherein the indicator is assigned to one or more of unused states of the resource block assignment field of the control message further based on a maximum bandwidth.

8. An apparatus comprising:
   a receiver that receives a control message including an indicator for indicating termination of a control channel monitoring and termination of a data transmission,
   wherein the indicator is assigned to one or more of unused states of the resource block assignment field of the control message based on a bit length of the indicator,
   wherein the indicator is a binary value with a pattern of "x0" or "x00" for all system frequency bandwidths, "x" is all "1",
   wherein length of x is determined by a bit length of the resource block assignment field or an associated system frequency bandwidth.

9. The apparatus of claim 8, wherein the maximum bandwidth of the data transmission is configured by a higher layer signaling.

10. The apparatus of claim 8, wherein the indicator is assigned to one or more of unused states of the resource block assignment field of the control message further based on a maximum bandwidth.

* * * * *